United States Patent [19]

Barr

[11] 4,294,088
[45] Oct. 13, 1981

[54] SECURITY DEVICE FOR SPARE TIRES

[76] Inventor: Rolla W. Barr, 16300 Fontaine Dr., Chesterfield, Mo. 63017

[21] Appl. No.: 951,757

[22] Filed: Oct. 16, 1978

[51] Int. Cl.³ ............... B60R 43/00; B60R 43/02; E05B 67/38; E05B 73/00
[52] U.S. Cl. ............................... 70/56; 70/58; 70/232; 70/259; 224/42.25; 248/552; 280/769
[58] Field of Search ............... 70/259, 230, 232, 56, 70/58, 54, 55, 39, 229; 224/42.25, 42.24, 42.23, 42.3; 248/552, 503, 505; 280/769, 789, 414 R; 296/37.2; 211/8, 23

[56] References Cited

U.S. PATENT DOCUMENTS

| 1,292,687 | 1/1919 | Biggs | 70/259 UX |
|---|---|---|---|
| 1,429,105 | 9/1922 | Rudy | 70/56 |
| 1,913,835 | 6/1933 | Golike | 224/42.23 X |
| 3,287,943 | 11/1966 | Vaughn et al. | 70/232 X |
| 3,805,564 | 4/1974 | Velardo | 70/54 X |
| 3,880,335 | 4/1975 | Winkler | 296/37.2 X |
| 3,884,057 | 5/1975 | Maurer | 70/54 X |
| 3,940,178 | 2/1976 | Le Veque | 224/42.24 X |
| 4,008,587 | 2/1977 | Frentzel et al. | 70/56 X |
| 4,076,158 | 2/1978 | Barr | 70/259 X |
| 4,122,693 | 10/1978 | Barr | 70/56 |

FOREIGN PATENT DOCUMENTS

| 555506 | 4/1958 | Canada | 224/42.23 |
|---|---|---|---|
| 621667 | 2/1927 | France | 224/42.24 |
| 329696 | 9/1935 | Italy | 70/232 |
| 265943 | 9/1927 | United Kingdom | 224/42.24 |

Primary Examiner—Roy D. Frazier
Assistant Examiner—Carl F. Pietruszka
Attorney, Agent, or Firm—James R. Bell

[57] ABSTRACT

A security device for spare tires includes a housing including an opening for receiving a shackle portion of an associated padlock. Other openings are provided for receiving an associated member to be secured by the padlock. A shackle-securing member releasably secures the shackle within the housing.

4 Claims, 5 Drawing Figures

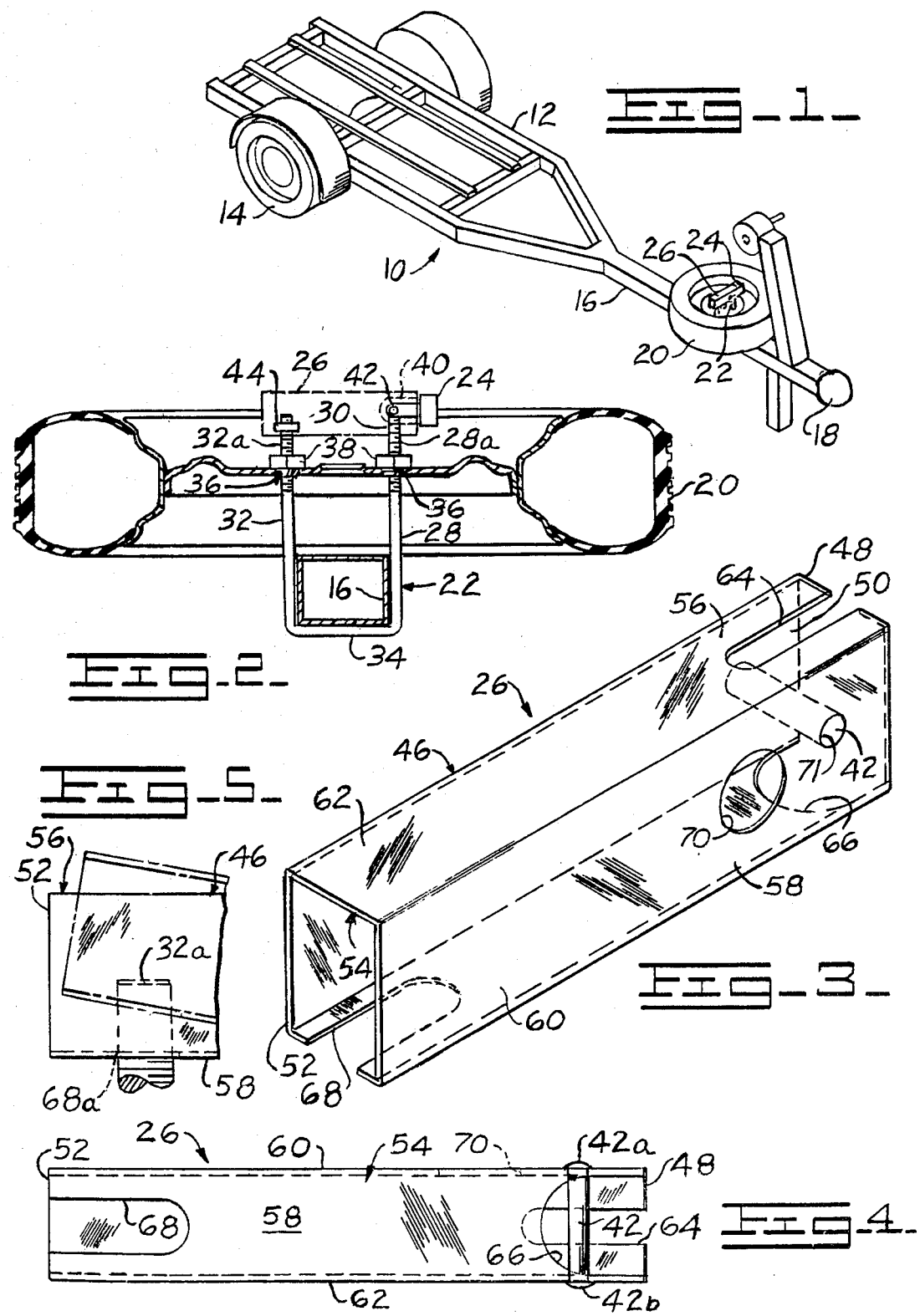

SECURITY DEVICE FOR SPARE TIRES

BACKGROUND OF THE INVENTION

1. Field of the Invention

This invention relates generally to locks of the portable padlock type and more particularly to accessories such as protective devices for such locks. Also, this invention relates to using such devices for securing vehicle accessories such as spare tires.

2. Description of the Prior Art

In the past, security devices have utilized portable padlocks. One such device provides an insert to be secured within the loop formed by the shackle portion of the lock to prevent an instrument from being inserted through the loop for prying the lock open. However, such an insert device does not shield the shackle from being cut or otherwise tampered with since the shackle is substantially exposed. For example, a sharp blow applied to the body of the lock can sometimes disengage the shackle from the lock. Other such devices include a padlock and a shield covering the padlock shackle. In some instances, the shield and shackle are permanently connected to each other so that the padlock can only be used in connection with the shield. Also, some of these devices are used in combination with security cables or chains which, in some cases, are permanently attached to the shield.

These rather light duty prior art devices are not satisfactory for mounting and securing exposed spare tires such as those mounted on boat trailers.

In view of the above, it would be advantageous to provide a device satisfactory for mounting a spare tire on a boat trailer and an appropriate shield for protecting a padlock to be used for securing the spare tire.

SUMMARY OF THE INVENTION

The present invention is directed to overcoming one or more of the problems as set forth above.

According to the present invention, this is accomplished by providing a protective device for padlocks. The device is generally in the form of a covering shield for guarding and protecting the shackle portion of the lock without interfering with the ability of the shackle to be secured to an associated member to be locked. The device includes a housing having an opening for receiving a shackle portion of a padlock. Other openings are provided for receiving an associated member to be secured by the padlock. The associated member also retains the spare tire in place. A shackle-securing member is provided for releasably securing the shackle within the housing.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view illustrating the utility of this invention in combination with a boat trailer and a spare tire;

FIG. 2 illustrates the shackle guard of this invention in combination with a padlock and an associated member secured by the padlock;

FIG. 3 is an isometric view of the shackle guard of this invention;

FIG. 4 is a side view illustrating the shackle guard of this invention; and

FIG. 5 is a partial side elevational view illustrating an alternative housing.

DETAILED DESCRIPTION

FIG. 1 illustrates a well-known type of boat trailer generally designated 10. A frame portion 12 of trailer 10 is supported by wheels 14. An arm 16 extends from frame 12 and terminates at a socket type hitch 18. A spare tire 20 can be mounted on arm 16. An associated member 22 is used to retain tire 20 on arm 16. A padlock 24 is used to secure the associated member and a shackle guard or shield 26 is provided to protect padlock 24 against tampering.

FIG. 2 illustrates spare tire 20 mounted on arm 16. An associated member 22 is preferably a "U" shaped bolt formed of steel, preferably, and having a first portion 28 being a threaded end 28a and including a shackle-receiving bore 30 formed therethrough. A second portion 32 of member 22 is another threaded end 32a. First and second portion 28, 32 are substantially parallel and as shown are spaced by a transverse third portion 34. Member 22 engages arm 16 and the threaded ends 28a, 32a extend through lug holes 36 formed in spare tire 20. As a result, lug nuts 38 can be tightened down on threaded ends 28a, 32a so that spare tire 20 is firmly mounted on arm 16. A square nut 44 is also threaded on threaded end 32a and spaced from lug nut 38. Shackle guard 26 is mounted on the associated member 22 and padlock 24 is secured to associated member 22 by inserting its shackle 40 through bore 30. Also, padlock 24 is secured to guard 26 since shackle 40 releasably engages a shackle-securing means such as pin 42 to be discussed later in greater detail. In this manner, guard 26, padlock 24 and member 22 are releasably interconnected for securing spare 20 on trailer 10.

It can be seen by referring to FIGS. 3 and 4 that a shackle guard, generally designated 26, comprises a housing 46 preferably having a substantially rectangular cross-section. However, the cross-sectional configuration may vary. The rectangular shape is convenient since the housing is preferably formed of a section of low-carbon steel tubing. If desirable, the housing can be made of any suitable metal or even a synthetic material. The size of the tubing must be sufficient to accommodate a shackle portion of a lock as will be discussed later in greater detail.

One end 48 of housing 46 includes a cavity 50 formed therein. In the preferred form, of course, where a rectangular section of steel tubing is used to form housing 46, cavity 50 extends through housing 46 from the one end 48 to an opposite end 52. However, it is anticipated that alternative type housings may be used which are not formed of a tubing section and thus a cavity 50 must be formed in the one end 48.

The cavity 50 in housing 46 has a sidewall 54 formed therearound terminating at the opposite ends 48,52. Sidewall 54 has opposed sidewall portions 56,58 and opposed sidewall portions 60,62. A first means such as relief 64 is formed in portion 56 of sidewall 54. Relief 64 is in open communication with the end 48 and extends therefrom toward the opposite end 52. First relief 64 is of a construction sufficient for receiving into cavity 50 a shackle portion 40 of padlock 24. A second means such as relief 66 is formed in portion 58 opposite portion 56 of sidewall 54. Relief 66 is in open communication with end 48 and extends therefrom toward the opposite end 52. Second relief 66 is of a construction sufficient for receiving into cavity 50 threaded end 28a of associated member 22.

A shackle-securing means such as pin 42 is preferably formed of a cold rolled low-carbon steel cut from bar stock. Pin 42 is secured to sidewall portions 60,62 of the housing 46 and is recessed within cavity 50 for securing shackle portion 40 of lock 24 within cavity 50.

A third means such as relief 68 is formed in portion 58 of sidewall 54. Relief 68 is in open communication with opposite end 52 and extends therefrom toward end 48. Relief 68 is of a construction sufficient for receiving, into cavity 50, threaded end 32a of associated member 22.

It should be noted here that square nut 44 is of a size sufficient to fit into cavity 50 when threaded on threaded end 32a but also of a size sufficient to limit its rotation within cavity 50 so that nut 44 cannot be removed from end 32a as positioned in FIG. 2. Thus, nut 44 is a means for retaining end 32a in housing 46.

Means such as an opening 70 is formed in portion 60 of sidewall 54 between ends 48,52. Opening 70 is adjacent pin 42 for providing manual access to shackle 40. Opening 70 is of a construction sufficient for permitting a finger to be inserted therethrough for the purpose of depressing shackle 40 into locked engagement with its associated padlock 24.

FIG. 5 illustrates that a circular opening 68a can be used as an alternative to slot 68 if desired. Opening 68a is formed in portion 58 of sidewall 54. Use of opening 68a can eliminate nut 44 since opening 68a may be large enough to receive threaded end 32a but may be small enough to limit movement of housing 46 when housing 46 is tilted as illustrated in FIG. 5. Of course, if lock 24 is first removed from threaded end 28a then housing 46 may be separated from ends 28a,32a, simultaneously.

As an example, making housing 46 in its preferred form requires cutting a section of low-carbon steel tubing which may vary in length between the one end 48 and its opposite end 52. Also the thickness of sidewall 54 may be varied. First relief 64 and second relief 66 may be formed through sidewall portions 56,58, respectively, by a milling cutter or an end mill, and the reliefs deburred. An opening 71 for pin 42 may be formed through sidewall portions 60,62 by a drill jig. Pin 42 can be peened to stake, swedge or swell the ends 42a, 42b of pin 42 thus securing pin 42 in housing 46.

Of course, many other methods may be used to secure pin 42 in housing 46 such as welding or the like. If housings 46 are to be mass produced, a die and punch press may be used to stamp out reliefs, 64,66,68 and openings 70,71 in a single operation, and a second operation as described above can secure pin 42 in the housing.

Upon assembly of pin 42 in housing 46, a suitable process may be used to case harden the shackle guard 26. The process should be applied to case harden all exposed surfaces of the guard 26, but retain a soft core therebetween so that the sidewall 54 is not unnecessarily brittle. The advantageous case-hardening aids shackle guard 26 in resisting tampering by various means such as cutting or prying. Thus, the result is a substantially tamper-resistant shackle guard for padlocks.

In operation, it can be seen that member 22 engages arm 16 and spare 20 so that threaded ends 28a, 32a extend through lug holes 36. Lug nuts are then tightened down on the threaded ends to secure spare 20 firmly on arm 16. Square nut 44 is then threaded onto end 32a in spaced relationship with a lug nut 38. Shackle guard 26 is then mounted on member 22 so that threaded end 28a extends through relief 66 into cavity 50 and threaded end 32a extends through relief 68 into cavity 50. Shackle 40 is inserted through relief 64 around pin 42 and through bore 30 of threaded end 28a. A finger can be inserted through opening 70 to snap shackle 40 into locked engagement with its associated padlock 24. Thus, guard 26 protects shackle 40 from being tampered with and the guard 26 also engages both threaded ends 28a, 32a of member 32 to limit removal of lug nuts 38.

The foregoing has described a securing device for spare tires to trailers and a protective device for padlocks in the form of a covering shield for guarding and protecting the shackle portion of the lock without interfering with the ability of the shackle to be secured to an associated member to be locked.

What is claimed is:

1. A security device for spare tires comprising:
   a housing having first means for receiving a shackle portion of an associated padlock, and second means for receiving a first portion of an associated member to be secured by the padlock, said first means being a relief adjacent one end of the housing and said second means being a relief opposite the first relief and adjacent the one end;
   shackle-securing means connected to the housing adjacent the one end;
   third means for receiving a second portion of the associated member, said third means being a relief adjacent another end of the housing opposite the one end; and
   means for manual access to the shackle, said means being an opening formed in the housing between the opposite ends.

2. The device of claim 1, wherein:
   the first relief is in a first wall of the housing;
   the second and third reliefs are in a second wall of the housing opposite the first wall; and
   the means for manual access is in a third wall of the housing.

3. A security device in combination with a trailer, comprising:
   a spare wheel mounted on the trailer;
   a padlock;
   an associated member connected to the padlock, the spare wheel and the trailer;
   a housing having first means for receiving a shackle portion of the padlock, and second means for receiving a first portion of the associated member, said first means being a relief adjacent one end of the housing and said second means being a relief opposite the first relief and adjacent the one end;
   shackle-securing means connected to the housing for releasably securing the shackle within the housing;
   third means for receiving a second portion of the associated member, said third means being a relief adjacent another end of the housing opposite the one end; and means for retaining the second portion of the associated member in the housing, the associated member being a "U" shaped bolt mounted on the trailer, the first portion being a threaded end of the bolt extending through a lug hole of the wheel having a shackle receiving bore formed therethrough and the second portion being another threaded end of the bolt extending through another lug hole of the wheel.

4. A security device for spare tires which includes a shackle guard for padlocks having a housing defining a cavity therein and a plurality of connected walls surrounding the cavity, the improvement comprising:

a first wall defining first means adjacent one end of the housing for permitting a shackle portion of the padlock to pass therethrough into and out of the cavity;

a second wall defining second means adjacent the one end and opposite the first means for permitting a first portion of a member to be secured by the padlock to pass therethrough into and out of the cavity;

the second wall further defining third means adjacent another end of the housing opposite the one end for permitting a second portion of the member to be secured by the padlock to pass therethrough into and out of the cavity; and the housing defining means for manual access to the shackle, said means being an opening formed in the housing between the opposite ends.

* * * * *